United States Patent [19]
Hochstein

[11] Patent Number: 4,959,755
[45] Date of Patent: Sep. 25, 1990

[54] AUTOMATIC BATTERY POWERED VIDEO LIGHT

[76] Inventor: Peter A. Hochstein, 2966 River Valley Dr., Troy, Mich. 48098

[21] Appl. No.: 310,307

[22] Filed: Feb. 13, 1989

[51] Int. Cl.$^5$ .......................... G03B 15/02; G01J 1/32; G05F 1/00; H05B 39/04
[52] U.S. Cl. ........................................ 362/4; 250/205; 315/151; 315/153; 315/158; 315/241 S; 315/291; 315/307; 354/413; 362/5; 362/276
[58] Field of Search ............... 362/4, 5, 276; 315/151, 315/158, 153, 291, 307, 241 S; 250/205; 354/413

[56] References Cited

U.S. PATENT DOCUMENTS

| 2,757,274 | 7/1956 | Myers | 354/413 |
| 3,002,099 | 9/1961 | Gregory | 250/205 |
| 3,177,397 | 4/1965 | Keeran | 362/276 |
| 3,456,155 | 7/1969 | Buchanan | 250/205 |
| 3,473,084 | 10/1969 | Dodge | 315/158 |
| 3,488,434 | 1/1970 | Farber | 250/205 |
| 3,898,512 | 8/1975 | Buck | 315/153 |
| 4,368,406 | 1/1983 | Kruzich | 315/158 |
| 4,464,606 | 8/1984 | Kane | 315/158 |
| 4,634,933 | 1/1987 | Kamon et al. | |
| 4,682,084 | 7/1987 | Kuhnel | 315/158 |
| 4,808,809 | 2/1989 | Hayakawa | 250/205 |

FOREIGN PATENT DOCUMENTS 134659  10/1979  Japan ................... 250/205

Primary Examiner—Douglas Hart
Attorney, Agent, or Firm—Reising, Ethington, Barnard, Perry & Milton

[57] ABSTRACT

An automatic battery powered video light (10) is supplied power by a d.c. battery (16). A light (20) is connected between a first terminal of the battery (16) and a MOSFET switch (46), which is connected to a second terminal of the battery (16). A control circuit (24) controls the opening and closing of the MOSFET (46) to supply power to the light (20) and disconnect power from the light (20). The control circuit (24) includes a light sensor (36) for sensing ambient light and reflected radiant light from a scene (14) and a pulse width modulator (40) for controlling the MOSFET switch (46). The modulator (40) increases pulse width and therefore closing time of the switch (46) when the sensor (36) senses time low light levels, and vice versa. Also provided is a dual filament light (20') wherein each filament (52, 54) is independently controlled to enhance color balance.

23 Claims, 3 Drawing Sheets

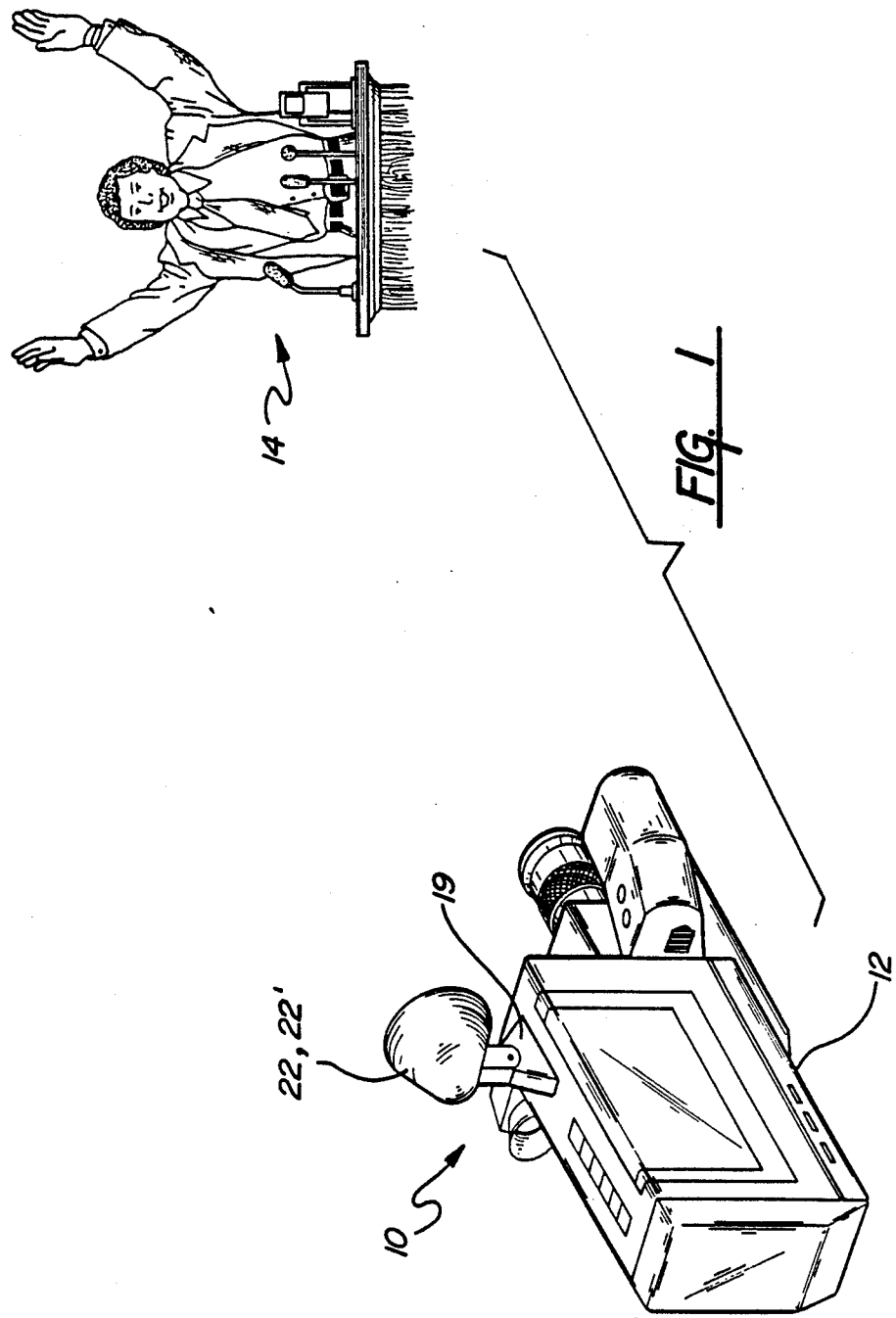

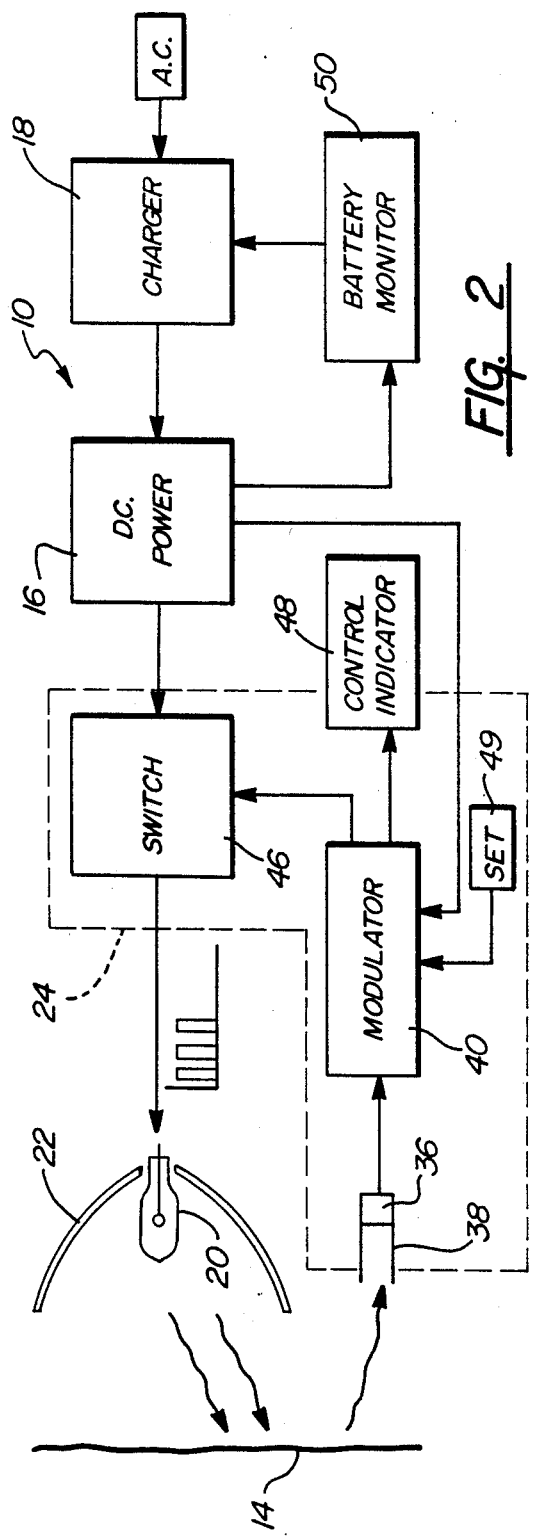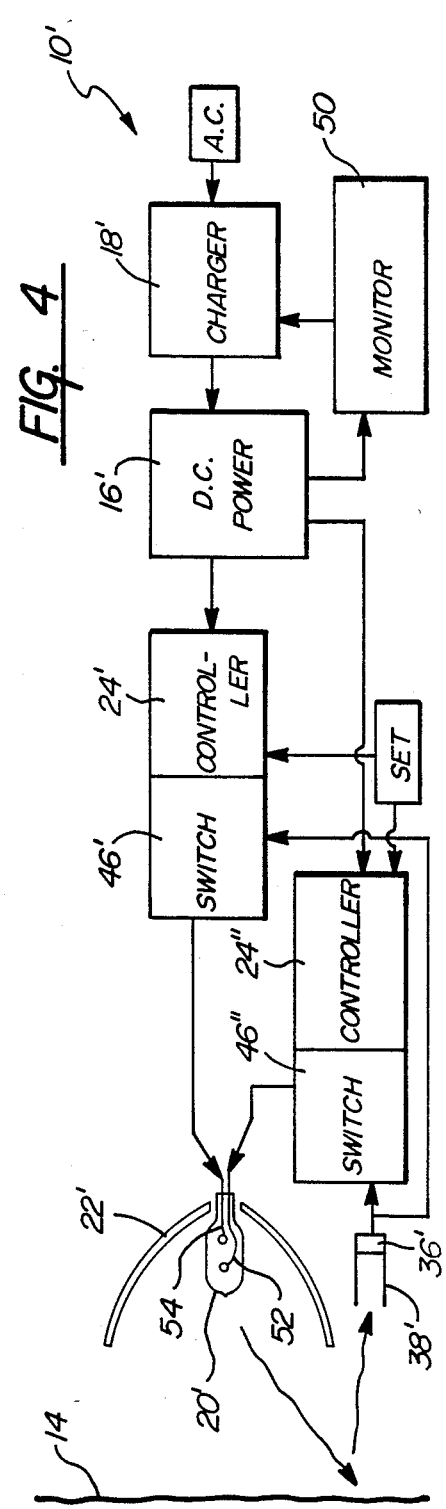

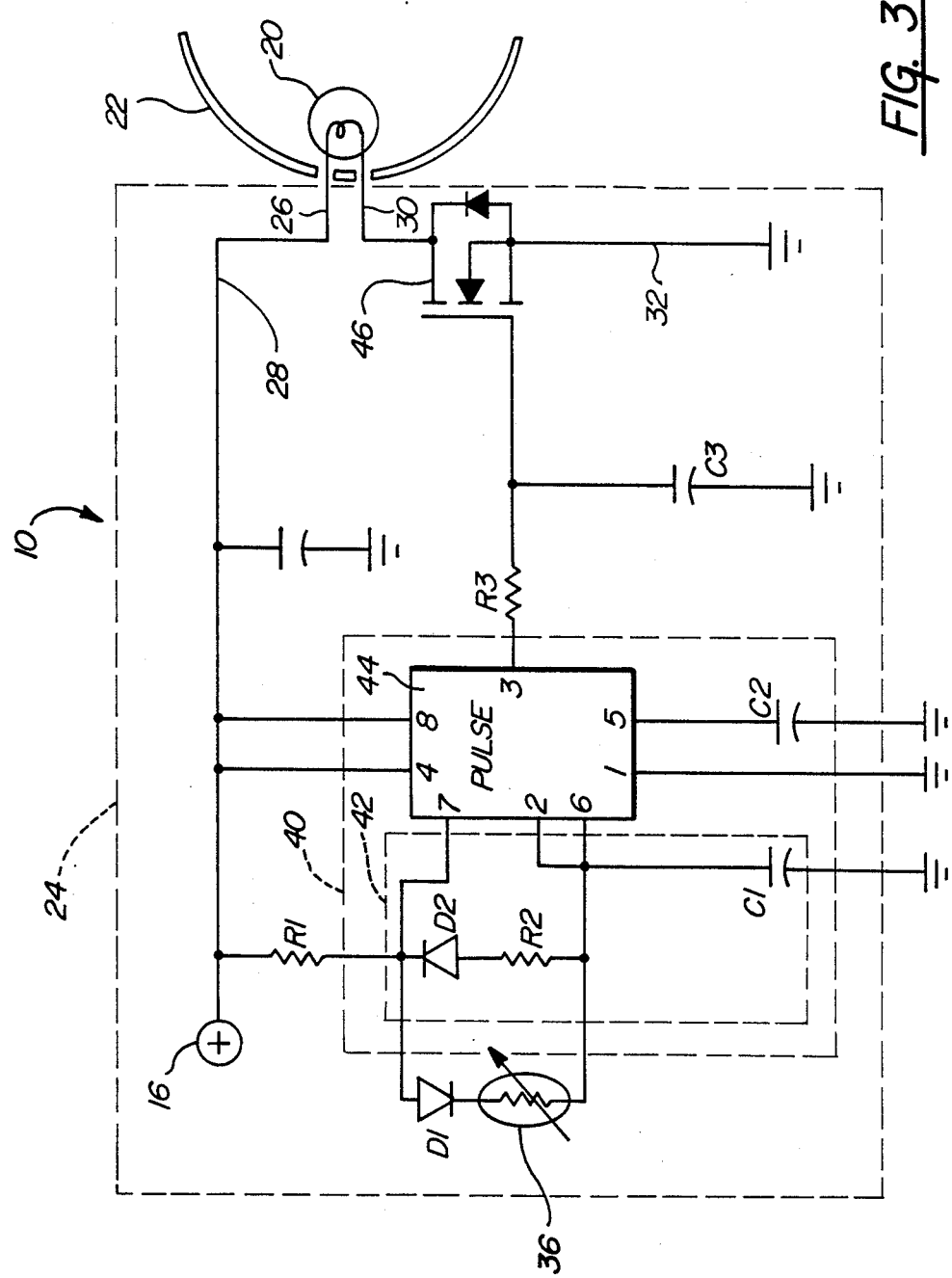

AUTOMATIC BATTERY POWERED VIDEO LIGHT

TECHNICAL FIELD

The invention relates to a portable light for producing illumination of variable intensity, and more specifically, for use with cameras to illuminate a scene for photographing.

BACKGROUND OF THE INVENTION

Portable video and film camera lights are generally common. Typically, these lights use a halogen cycle incandescent lamp in an efficient parabolic or elliptical reflector, and are powered by a belt mounted rechargeable battery pack. Early versions of portable lamps used quartz iodine lamps in the 100 W to 150 W power range and ran at a nominal color temperature of 3200° K. Power packs employing rechargeable secondary batteries such as lead-acid, sealed lead calcium or even nickel cadmium cells become unmanageably heavy and awkward if they are designed power 100 Watt lamps for any reasonable length of time. The relatively high levels of illumination developed by these high powered lamps was dictated primarily by the motion picture cameras and color film which were available at the time. Modern video cameras utilizing charge coupled devices or MOS sensors have excellent low light sensitivity and can produce acceptable images at light levels below 10 lux. The requirement for high power video lighting is therefore disappearing and instead only modest auxiliary lighting is needed for most indoor video taping. Furthermore, in most home video situations, distances of only several meters are involved so that lower power lamps are usually adequate. Experience has indicated that 25 Watt high brightness halogen lamps produce enough light for many "close in" taping situations, and are only inadequate at relatively great distances or at very close range, where they can wash out the image highlights due excessive brightness. High brightness video lamps running at high temperature generally last very few hours.

The range of illumination encountered in indoor close up taping and outdoor fill situations is very great. In many applications of auxiliary lighting the dynamic lighting control range of the typical video camera is inadequate. Even though camera lens iris control and image sensor gain can be adjusted, often it is more expedient to control the illumination level by adjustment of the off camera lighting equipment.

There are light responsive devices for controlling various types of lamps, but none are portable and to be used with cameras. One light responsive device is utilized with a control panel, such as on a vehicle. The panel control includes an ambient light sensor, wherein constant contrast illumination control is achieved by pulse width modulation. As the sensor sensing greater ambient light, the pulse widths increase to provide greater illumination. Such a device is disclosed in U.S. Pat. No. 4,368,406 issued Jan. 11, 1983 in the name of Kruzich et al.

A second type of light responsive control is disclosed in U.S. Pat. No. 4,464,606 issued Aug. 7, 1984 in the name of Kane and U.S. Pat. No. 4,682,084 issued July 21, 1987 in the name of Kuhnel et al. Both systems are self-adjusting ballasts for fluorescent lamps. A light sensor maintains the lamps at a predetermined brightness level.

None of the prior art systems disclose a battery powered, portable light for use with cameras which automatically varies lamp output. None of these prior art devices could be used as a portable video lamp.

SUMMARY OF THE INVENTION AND ADVANTAGES

The invention is a portable light assembly adapted to be connected to a camera and directed toward the scene. The assembly comprises portable housing means adapted to be connected to a camera. The housing means includes battery power means supported by the housing means for supplying d.c. power, radiant means supported by the housing means and connected to the battery power means for producing radiant energy to illuminate a scene, and control means connected between the battery power means and the radiant means for receiving a control signal and for switching power to the radiant means controlling the intensity of illumination by the radiant means. The control means includes sensor means for sensing ambient light and reflected radiant energy from the scene indicative of brightness of the scene and for producing the control signal, and switching means responsive to the control signal for switching power to the radiant means controlling the brightness. The switching means including a field-transistor for switching high current to said radiant means.

The invention also includes control means connected to the power supply means and the radiant means for receiving a control signal comprised of pulses and for switching power to the radiant means controlling the intensity of the illumination by said radiant means. The control means includes sensor means for sensing ambient light and reflected radiant energy from the scene indicative of brightness of the scene, modulator means connected to and responsive to the sensed brightness by the sensor means for producing a control signal and for controlling the width of the pulses to control the average intensity of illumination by said radiant means, and switching means in series with the power means and the radiant means for receiving the control signal and for switching the power to the radiant means for a time proportional to the width of the pulses.

The invention also provides a radiant means which includes a first filament means for producing a predetermined intensity of illumination and a second filament means for producing a variable of intensity of illumination and control means connected to the power supply means and the second filament means for switching power to the second filament means to automatically control the intensity of illumination produced by the second filament means.

The invention provides a portable, battery powered video light which is automatically controlled to provide optical illumination levels in a variety of situations while it conserves battery power. Furthermore, the use of two filaments maintains proper color balance.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of the subject invention;

FIG. 2 is a schematic diagram of the first embodiment of the subject invention;

FIG. 3 is the more specific schematic diagram of the first embodiment; and

FIG. 4 is a schematic diagram of the second embodiment of the subject invention.

DESCRIPTION OF THE PREFERRED EMBODIMENT

A portable light assembly for use with a camera 12 is generally indicated at 10 in FIG. 1. The light assembly 10 illuminates a scene 14 which is being photographed by the camera 12. The assembly 10 includes power supply means 16 for supplying power to allow the assembly 10 to become portable. The power supply means 16 may be a nickel-cadmium or sealed lead-acid rechargeable battery pack. The battery pack 16 includes a charger/adapter 18 for connection to an external power source, such as a 120 V. ac outlet, as is commonly known. The assembly 10 is ease of maneuvering with the camera 12 or attachment therewith. The battery 16 may be enclosed in the housing 19 or individually portable, i.e., to be separately carried by the photographer with a power line to the assembly 10.

The assembly 10 includes radiant means 20 connected to the battery 16 for producing radiant energy to illuminate the scene 14. The radiant means 20 is generally a halogen incandescent lamp. By using a high brightness, medium power, halogen incandescent lamp 20, the assembly 10 can automatically adjust its average output power to maintain essentially constant illumination of a scene or subject 14, irrespective of scene 14 reflectivity or distance from the illuminating lamp 20. At relatively farther distances, the lamp 20 runs "wide open" and operates at its maximum rated output, typically 25–50 Watts. At closer distances to the scene or subject 14, the assembly 10 reduces lamp 20 brightness to compensate for its proximity or to compensate for high ambient light levels. The assembly 10 will also compensate for changing scene 14 brightness due to changes in reflectivity of the subject 14. Alternatively, the radiant means 20 may comprise a fluorescent lamp. The lamp 20 includes a reflector 22 to direct all of the radiant output of the lamp 20 toward the scene 14.

The assembly 10 includes control means 24 connected to the power supply 16 and the radiant means 20 for receiving a control signal comprised of pulses and switching power to the radiant means 20 to control the intensity of illumination by said radiant means 20. More specifically, the lamp 20 has a first lead wire 26 connected to the positive terminal 28 of the battery 16 and a second lead wire 30 connected through the control means 24 to the ground terminal 32. The control means 24 connects and disconnects the second lead wire 32 to ground 34 to supply power to the lamp 20 when connected to control the intensity of illumination. Since only the time current through a lamp 20 filament determines the temperature, it is possible to control the output of lamps 20 with variable duty cycle dc pulses.

The control means 24 includes sensor means 36 for sensing ambient light and reflected radiant energy from the scene 14 indicative of brightness of the scene 14, which acts as feedback to the assembly 10. The sensor means 36 is a photo sensor. The photo sensor 36 is either photo voltaic or photo resistive to increase or decrease voltage or resistance proportional to the amount of light impinging thereon. Generally included is a collimator 38 for limiting the field of view of light sensed by the photo sensor 36. The collimator 38 directs the sensitivity of the photo sensor in the direction of the lamp 20 in order to sense the brightness of the scene 14.

The camera 12 photographs a scene 14 of limited cross-sectional view, dependent on distance. Therefore, it is important that the photo sensor 36 only receive light energy from the same general direction at which the camera 12 is directed. The collimator 38 ensures that light is received from only the scene 14 at which the camera 12 is directed.

The control means 24 includes modulator means 40 responsive to the sensed brightness by the sensor means 36 for producing the control signal and for controlling the width of the pulses to control the intensity of illumination by the radiant means 20. The modulator means 40 is generally a pulse width modulator, as commonly known in the art. The pulse width modulator 40 may include a 555 integrated circuit timer chip configured as a pulse width modulator 40. The pulse width modulator 40 running in excess of the lamp 20 flicker rate, typically 100–500 Hz, is preset by the user or manufacturer to some nominal level to yield a given pulse width ON time for a given scene brightness.

The modulator means 40 includes timing means 42 responsive to the sensor means 36 for producing a timing signal indicative of a time period inversely proportional to brightness, and pulsing means 44 for receiving the timing signal to produce the control signal having pulse width proportional to the time period. The timing means 42 is connected to the photo sensor 36 and produces the timing signal representative of the time period of charging a capacitor C1. The pulsing means 44 comprises the 555 timer chip. The timer means 42 receives power through resistor R1 and to a forward biased diode D1 and reversed biased diode D2. The forward biased diode D1 is connected to the photo sensor 36 (resistive) to capacitor C1 to ground. The reverse biased diode D2 is connected though resistor R2 to the capacitor C1. The capacitor C1 is connected to input pins 2 and 6 of the 555 timer 44, and resistor R1 is connected to pin 7. The timer 44 is powered at pins 4 and 8 and grounded at pin 1 and through capacitor C2 to pin 5. The output pin 3 produces the control signal through a low pass filter comprising resistor R3 and capacitor C3.

The control means 24 further includes switching means 46 in series with the battery 16 and the light 20 for receiving the control signal and for switching power to the radiant means 20 for a time proportional to the width of the pulses. The switching means 46 comprises a field-effect transistor (FET). The advent of reasonably price MOSFET devices which can switch tens of Amperes at relatively high speed permit efficient pulse width control of low voltage, high current loads. Bipolar transistors which were previously available suffer from high drive current requirement and high dissipation loss due to typical Vce levels of 0.7 volts. A bipolar transistor or other transistors may also be utilized.

The lamp 20 is driven by the MOSFET power switch 46 which receives continuous power from the dc source 16. The gate of the FET switch 46 receives the control signal and the drain is connected to the ground terminal 32 and the source is connected to the second lead wire 26 of the lamp 20. Therefore, when the FET switch 46 is switched on by a pulse, current flows through the lamp 20 where upon turning off the switch 46, current is prevented from flowing through the lamp 20.

The pulse width modulator 40 yields the given pulse width ON time for a given scene brightness. The photo sensor 36 then either increases or decrease this ON time pulse width in response to the sensed scene 14 brightness. Pulse width modulation control of a lamp 20 not only greatly extends battery 16 operating time, but increases lamp 20 life by reducing the length of time that the filament has to run at extremely high temperatures. Extended operation at lower power levels, which is unlikely in typical consumer video camera use, does present some problems, however. Halogen cycle incandescent lamps depend on a minimum bulb wall temperature of about 200 degrees C. in order to vaporize the tungsten halide (bromide or iodide) and prevent deposition on the envelope. Some darkening of the bulb would result from extended low temperature operation as the tungsten halide (bromide or iodide) collect on the relatively cool bulb wall. This effect is temporary as momentary operation at an elevated temperature would again volatilize these deposits. Electronic limits could be established to prevent bulb operation at high ambient light levels to prevent extended low wattage use.

The assembly 10 includes a control indicator 48 which is useful to inform the user that the scene brightness is within the servo control range. Either monitoring the pulse width modulator 40 using a window comparator to supervise the photo detector 36 is adequate.

The assembly 10 further includes charge monitor means 50 for monitoring the charge on the battery 16 and for visually indicating the time remaining on the charge. The monitor 50 informs the user of the time remaining on a given charge, so that recharging can be planned at a convenient time.

The control means 24 includes a preset switch 49 for establishing the desired brightness of the scene 14. The control signal is compared to this preset level to determine any change in present pulse width output. If the control signal indicates greater brightness than the present level, the pulse width is decreased, and vice versa.

A further problem is presented that in critical taping were color rendition is important, maintaining proper color balance is difficult when the color of the illuminating light is changing. In other words, as the color balance of the illuminator 20 shifts due to changes in power level (filament temperature) the scene 14 becomes "warmer" or "cooler". Camera image sensors 12 do not adapt as the human eye to color shift, even with the automatic white balance feature of most cameras 12. The white balance control usually electronically corrects for non-optimal color temperatures by monitoring a "white" level in the image 14. Assuming the object should be truly white, the camera 14 then adjusts the primary color gain levels to yield an acceptable "white" output signal applying the same correction to all other elements. Should the white subject change position, reflectivity or disappear, color balance is drastically effected. Under constant color illumination, most cameras 12 actually yield better results with fixed daylight or tungsten settings. Under those conditions, it is imperative that the color temperature of the illumination remain reasonably constant making variable light output incandescent lamps unsuitable for critical work.

The second embodiment of the assembly 10' addresses these color problems and is generally illustrated in FIG. 4. Common components as in the first embodiment 10 are indicated by like numbers primed. The second embodiment 10' utilizes the same portable housing 19 directed at the scene 14, as illustrated in FIG. 1.

The radiant means 20' includes first filament means 52 for producing a first intensity of illumination and second filament means 54 for producing a second intensity of illumination. Instead of continuously varying the output power of the single filament lamp 20 and accepting the decrease in color temperature as the lamp 20 is dimmed, a single bulb 20' with two filaments 52, 54 is used. By operating each filament 52, 54 at a fixed power level, the illumination color balance remains constant, and the luminous efficiency of the lamp 20' remains high. The assembly 10 must now correct for greater changes in scene 14' illumination due to the step-wise transition from one filament 52 to two 54. Using one dual filament bulb 20' in a single reflector 22' and socket assembly saves cost, weight and space.

The control means 24', 24" is connected to the power supply means 16' and the first 52 and second 54 filaments for switching power to the filament 52,54 to automatically control the intensity of illumination. The assembly 10' includes sensor means 36' for sensing ambient light and reflected radiant energy from the scene 14. Included are first 46' and second 46" switching means connected to the first 52 and second 54 filaments, respectively, each in series with the battery 16' and the filaments 52, 54. The control means 24', 24" includes a first controller 24' and a second controller 24" for receiving the control signal and connected to the first 52 and second 54 filaments, respectively. The switching means 46', 46" are MOSFETs. The controllers 24', 24" may be of the modulated type described with respect to the first embodiment 10, or may allow the filament 52, 54 to operate at its rated output (a single predetermined level).

In a first dual filament embodiment, the second controller 24" is of the same type as the control means 24 described with respect to the single filament of first embodiment 10. The first controller 24' is connected to the battery 16' and the first filament 52 for switching power continuously to the first filament 52 to establish a predetermined intensity. The second controller 24" and switch 46" operate at a variable rate dependent on the control signal. For example, if high light level is sensed, it may be necessary to only operate the first filament 52 and not the second filament 54. If low light is sensed, the first filament 52 is continuously operated between ON and OFF and the second filament output 54 is variably operated to accomplish a predetermined brightness level as sensed by the sensor 36'. In other words, the controllers 24', 24" may include a comparator such that three levels are established. For example, if the output of the sensor 36' is below a first level, the first filament 52 will turn on; if the output is between the first and second level, the second filament 54 will turn on, and if the output is above the second level, both filaments 52, 54 will turn on.

A second embodiment includes controllers 24', 24" operating the first filament 52 and second filament 54 at individual predetermined intensities. Generally, the first filament will be continuously switched on at its rated output, and the second filament 54 will be switched on and off dependent upon the sensor 36' and amount of light required. There may be three levels of illumination produced by the light: A low level produced only by the first filament 52, an intermediate level produced only by the second filament 54 and a high level produced by both the first 52 and second filament 54. It is to be understood that the controllers 24', 24" may be any combination of the fixed regulated intensities or the variable modulated intensities.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A portable light assembly adapted to be connected to a camera and directed toward a scene, said assembly comprising: portable housing means adapted to be connected to a camera; battery power means for supplying d.c. power; radiant means supported by said housing means and connected to said battery power means for producing radiant energy to illuminate a scene; control means supported by said housing means and connected between said battery power means and said radiant means for receiving a control signal and for switching d.c. power to said radiant means controlling the intensity of illumination by said radiant means; said control means including sensor means for sensing ambient light and reflected radiant energy from the scene indicative of brightness of the scene and for producing said control signal, pulse width modulator for receiving said d.c. power and connected to and responsive to the sensed brightness by said sensor means for producing said control signal comprising pulses at a predetermined frequency and for controlling the width of said pulses to control the intensity of illumination by said radiant means, and switching means in series with said power means and said radiant means for receiving said control signal and for switching power to said radiant means controlling the brightness, said switching means including a transistor operating in switch mode for switching the d.c. power to said radiant means.

2. An assembly as set forth in claim 1 wherein said radiant means comprises a halogen lamp connected to said battery power means.

3. An assembly as set forth in claim 2 wherein said sensor means includes a photo sensor for sensing radiant energy.

4. An assembly as set forth in claim 3 wherein said sensor means includes a collimator for limiting the field of view of light sensed by said sensor means to the direction of the scene.

5. An assembly as set forth in claim 4 further including charge monitor means for monitoring the charge on said power supply means and for visually indicating the time remaining on the charge.

6. A portable light assembly directed toward a scene, said assembly comprising: battery power supply means for supplying d.c. power; radiant means connected to said power supply means for producing radiant energy to illuminate a scene; a control means connected to said power supply means and said radiant means for receiving a control signal comprised of pulses and for switching said d.c. power to said radiant means controlling the intensity of illumination by said radiant means; said control means including sensor means for sensing ambient light and reflected radiant energy from the scene indicative of brightness of the scene, pulse width modulator means for receiving said d.c. power and connected to and responsive to the sensed brightness by said sensor means for producing said control signal and for controlling the width of said pulses to control the intensity of illumination by said radiant means, switching means in series with said power means and said radiant means for receiving said control signal and for switching power to said radiant means for a time proportional to the width of said pulses; and including collimator means for shielding said sensor means from said radiant means and for limiting the field of view of light sensed by said sensor means to the direction of the scene.

7. An assembly as set forth in claim 6 further including portable housing means for supporting said power supply means and said radiant means and said control means.

8. An assembly as set forth in claim 7 wherein said modulator means includes timing means responsive to said sensor means for producing a timing signal indicative of a time period inversely proportional to brightness, and pulsing means for receiving said timing signal to produce said control signal having pulse width proportional to said time period.

9. An assembly as set forth in claim 8 wherein said switching means comprises a field-effect transistor (FET).

10. An assembly as set forth in claim 9 wherein said sensor means includes a photo sensor for sensing radiant energy.

11. An assembly as set forth in claim 10 further including charge monitor means for monitoring the charge on said power supply means and for visually indicating the time remaining on the charge.

12. An assembly as set forth in claim 11 wherein said radiant means comprises a halogen incandescent lamp.

13. A portable light assembly directed toward a scene, said assembly comprising: battery power supply means for supplying d.c. power; radiant means connected to said power supply means for producing radiant energy to illuminate a scene; said radiant means including first filament means for producing a first intensity of illumination and second filament means for producing a second intensity of illumination; sensor means for sensing ambient light and reflected radiant energy from the scene indicative of brightness of the scene, control means connected to said power supply means and said sensor means for independently switching power to said first filament means and said second filament means to automatically control the intensity of illumination produced by said filament means.

14. An assembly as set forth in claim 13 wherein said control means includes modulator means connected to and responsive to the sensed brightness by said sensor means for producing a control signal having pulses and for controlling the width of said pulses to control and intensity of illumination by said radiant means.

15. An assembly as set forth in claim 14 further including switching means for receiving said control signal and for switching power to said second filament means for a time proportional to the width of said pulses.

16. An assembly as set forth in claim 15 further including regulating means connected to said power supply means and said first filament means for switching power to said first filament at a predetermined rate to establish said predetermined intensity.

17. An assembly as set forth in claim 13 wherein said control means includes first switching means for supplying power to said first filament means and first controller connected to said sensor means for controlling said switching means to supply power and discontinue power to said first filament means.

18. An assembly as set forth in claim 17 wherein said control means includes second switching means for supplying power to said second filament and second controller connected to said sensor means for controlling said switching means to supply power and discontinue power to said second filament means.

19. A portable light assembly directed toward a scene, said assembly comprising: battery power supply means for receiving d.c. power at a positive and negative terminal; radiant means connected to said power supply means at the first terminal for producing radiant energy to illuminate a scene; a control means connected to said power supply means and said radiant means for receiving a control signal comprised of pulses and for switching said d.c. power to said radiant means controlling the intensity of illumination by said radiant means; said control means including sensor means for sensing ambient light and reflected radiant energy from the scene indicative of brightness of the scene, pulse width modulator for receiving said d.c. power and connected to and responsive to the sensed brightness by said sensor means for producing said control signal and for controlling the width of said pulses to control the intensity of illumination by said radiant means, and switching means in series with said power means and said radiant means for receiving said control signal and for switching power to said radiant means for a time proportional to the width of said pulses; said pulse width modulator means including timing means responsive to said sensor means for producing a timing signal indicative of a time period inversely proportional to brightness, and pulsing means for receiving said timing signal to produce said control signal having pulse width proportional to said time period; a low pass filter connected between said pulsing means and said switching means; said switch means comprising a transistor with a first terminal connected to said pulsing means and a second terminal connected to the negative terminal and a third terminal connected to the second terminal of said radiant means for switching power to said radiant means.

20. An assembly as set forth in claim 19 wherein said timing means comprises a timing capacitor.

21. An assembly as set forth in claim 20 further including a first resistor connect to said dc power, a diode with its anode connected to said first resistor and its cathode connected to said sensing means, said sensing means connected to said timing capacitor, a second diode with its cathode connected to said first resistor and a second resistor connected to the anode of said second diode and connected to said timing capacitor.

22. An assembly as set forth in claim 21 wherein said pulsing means comprises an integrated timer circuit connected to said timing capacitor and said low pass filter.

23. An assembly as set forth in claim 19 further including a low pass filter connected between said pulsing means and said switching means.

* * * * *